(12) United States Patent
Shuck et al.

(10) Patent No.: US 9,929,625 B2
(45) Date of Patent: Mar. 27, 2018

(54) NEGATIVE PRESSURE MOTOR SEALING

(71) Applicants: Rolls-Royce Corporation, Indianapolis, IN (US); Rolls-Royce PLC, London (GB)

(72) Inventors: Quinlan Yee Shuck, Indianapolis, IN (US); Gavin Baxter, Sheffield (GB)

(73) Assignees: Rolls-Royce Corporation, Indianapolis, IN (US); Rolls-Royce PLC, London (GB)

( * ) Notice: Subject to any disclaimer, the term of this patent is extended or adjusted under 35 U.S.C. 154(b) by 413 days.

(21) Appl. No.: 14/797,801

(22) Filed: Jul. 13, 2015

(65) Prior Publication Data

US 2016/0020672 A1  Jan. 21, 2016

Related U.S. Application Data

(60) Provisional application No. 62/025,789, filed on Jul. 17, 2014.

(51) Int. Cl.
| | |
|---|---|
| *H02K 9/08* | (2006.01) |
| *H02K 5/12* | (2006.01) |
| *H02K 5/22* | (2006.01) |
| *H02K 9/12* | (2006.01) |
| *H02K 9/19* | (2006.01) |

(52) U.S. Cl.
CPC .............. *H02K 9/08* (2013.01); *H02K 5/12* (2013.01); *H02K 5/22* (2013.01); *H02K 9/12* (2013.01); *H02K 9/19* (2013.01)

(58) Field of Classification Search
CPC .................................. H02K 9/08; H02K 5/22
See application file for complete search history.

(56) References Cited

U.S. PATENT DOCUMENTS

| | | | |
|---|---|---|---|
| 2,186,232 | A | 1/1940 | Baudry |
| 2,196,408 | A | 4/1940 | Baudry |
| 2,488,387 | A | 11/1949 | Elsey |

(Continued)

FOREIGN PATENT DOCUMENTS

| | | |
|---|---|---|
| DE | 4443427 A1 | 6/1996 |
| EP | 9410739 A1 | 5/1994 |

(Continued)

OTHER PUBLICATIONS

Intent to Grant dated Mar. 23, 2017, from counterpart European Application No. 15176710.0, 7 pp.

(Continued)

*Primary Examiner* — Dang Le
(74) *Attorney, Agent, or Firm* — Shumaker & Sieffert, P.A.

(57) ABSTRACT

A system includes an electric motor including a housing enclosing a substantially-sealed internal environment, a pump including an inlet connected to the substantially-sealed internal environment of the electric motor via a first conduit, and a fluid supply storing a makeup fluid, the fluid supply including an outlet connected to the substantially-sealed internal environment of the electric motor via a second conduit. The pump is configured to create a negative pressure within the substantially-sealed internal environment of the electric motor to mitigate potential contamination of an external environment of the electric motor with the makeup fluid.

20 Claims, 2 Drawing Sheets

(56) References Cited

U.S. PATENT DOCUMENTS

| | | | |
|---|---|---|---|
| 3,258,619 A | 6/1966 | Davidson | |
| 3,348,081 A | 10/1967 | Willyoung | |
| 3,840,762 A | 10/1974 | Kasabian | |
| 5,212,432 A | 5/1993 | Ohtani et al. | |
| 5,753,986 A | 5/1998 | Ohtani | |
| 6,008,553 A | 12/1999 | Gonzalez | |
| 6,471,494 B1 | 10/2002 | Miura et al. | |
| 6,750,588 B1 * | 6/2004 | Gabrys | F16C 39/063 310/113 |
| 6,794,777 B1 * | 9/2004 | Fradella | F16C 32/0457 310/68 B |
| 6,830,842 B2 | 12/2004 | Siepierski et al. | |
| 7,084,548 B1 * | 8/2006 | Gabrys | H02K 1/2793 310/156.08 |
| 7,141,898 B2 | 11/2006 | Thiot | |
| 7,969,051 B2 | 6/2011 | Vasilescu et al. | |
| 7,977,845 B1 | 7/2011 | Heitmann | |
| 8,159,094 B2 | 4/2012 | Ruffing et al. | |
| 8,198,764 B2 | 6/2012 | Booth et al. | |
| 2002/0149273 A1 | 10/2002 | Soitu et al. | |
| 2008/0055576 A1 | 3/2008 | Auer | |
| 2012/0049665 A1 | 3/2012 | Garriga et al. | |
| 2013/0307357 A1 | 11/2013 | Maksumic et al. | |

FOREIGN PATENT DOCUMENTS

| | | |
|---|---|---|
| WO | 2005124971 A1 | 12/2005 |
| WO | 2008113018 A1 | 9/2008 |

OTHER PUBLICATIONS

Response to Communication Pursuant to Rule 69 EPC dated Jul. 18, 2016 from counterpart European Application No. 15176710.0, 7 pp.

Communication Pursuant to Rules 69 EPC dated Jul. 18, 2016 from counterpart European Application No. 15176710.0, 2 pp.

Extended European Search Report from counterpart European Application No. 15176710.0, dated Jun. 10, 2016, 10 pp.

"Designation: F2792-12a, Standard Terminology for Additive Manufacturing Technologies," ASTM International, Sep. 9, 2013, 3 pp.

* cited by examiner

NEGATIVE PRESSURE MOTOR SEALING

RELATED APPLICATIONS

This application claims the benefit of U.S. Provisional Application No. 62/025,789, titled, "NEGATIVE PRESSURE MOTOR SEALING," filed Jul. 17, 2014, the entire content of which is incorporated herein by reference.

TECHNICAL FIELD

This disclosure generally relates to electric motors and generators, and more particularly, but not exclusively, to sealing techniques for electric motors and generators.

BACKGROUND

An electric motor designed to operate within a hazardous environment may provide a sealed housing to protect components of the electric motor from the hazardous environment.

SUMMARY

This disclosure includes sealing techniques for electric motors and generators. The disclosed techniques include applying a negative pressure to a sealed housing of the electric motor in order to prevent fluid from within sealed housing from escaping into the external environment.

In one example, this disclosure is directed to a system comprising an electric motor including a housing enclosing a substantially-sealed internal environment, a pump including an inlet connected to the substantially-sealed internal environment of the electric motor via a first conduit, and a fluid supply storing a makeup fluid, the fluid supply including an outlet connected to the substantially-sealed internal environment of the electric motor via a second conduit. The pump is configured to create a negative pressure within the substantially-sealed internal environment of the electric motor to mitigate potential contamination of an external environment of the electric motor with the makeup fluid.

In another example, this disclosure is directed to an electric motor comprising a housing enclosing a substantially-sealed internal environment, an outlet to the housing, the outlet being configured to apply a vacuum to the substantially-sealed internal environment, and an inlet to the housing, the inlet to the housing being configured to supply a makeup fluid to the substantially-sealed internal environment. The inlet and the outlet are configured to create a negative pressure within the substantially-sealed internal environment of the electric motor to mitigate potential contamination of an external environment of the electric motor with the makeup fluid.

In another example, this disclosure is directed to a method comprising operating an electric motor within an external environment, applying, during the operation of the electric motor, with a pump including an inlet connected to a substantially-sealed internal environment enclosed by a housing of the electric motor via a first conduit, a negative pressure to the substantially-sealed internal environment of the electric motor, and supplying, during the operation of the electric motor, a makeup fluid with a fluid supply via an outlet connected to the substantially-sealed internal environment of the electric motor via a second conduit. The negative pressure within the substantially-sealed internal environment of the electric motor mitigates potential contamination of the external environment with the makeup fluid.

The details of one or more examples of this disclosure are set forth in the accompanying drawings and the description below. Other features, objects, and advantages of this disclosure will be apparent from the description and drawings.

DETAILED DESCRIPTION

As described above, this disclosure includes sealing techniques for electric motors and generators. The disclosed techniques include applying a negative pressure to a sealed housing of the electric motor in order to prevent fluid from within sealed housing from escaping into the external environment. The disclosed techniques may have particular usefulness with electric motors operating in a controlled environment, the controlled environment being hazardous to the electric motors. Such controlled environments may include noble gasses, which are commonly utilized in a variety of manufacturing processes including directed energy deposition, semiconductor manufacturing, and other manufacturing processes. By providing a negative pressure to the sealed housing of the electric motor, the controlled environment is maintained even in the event of a leak in the sealed housing of the electric motor. Further, the negative pressure provides for leaking fluids from the controlled environment to be removed from the sealed housing of the electric motor to mitigate damage the leaking fluids from the controlled environment might cause to components of the electric motor.

Figure 1:
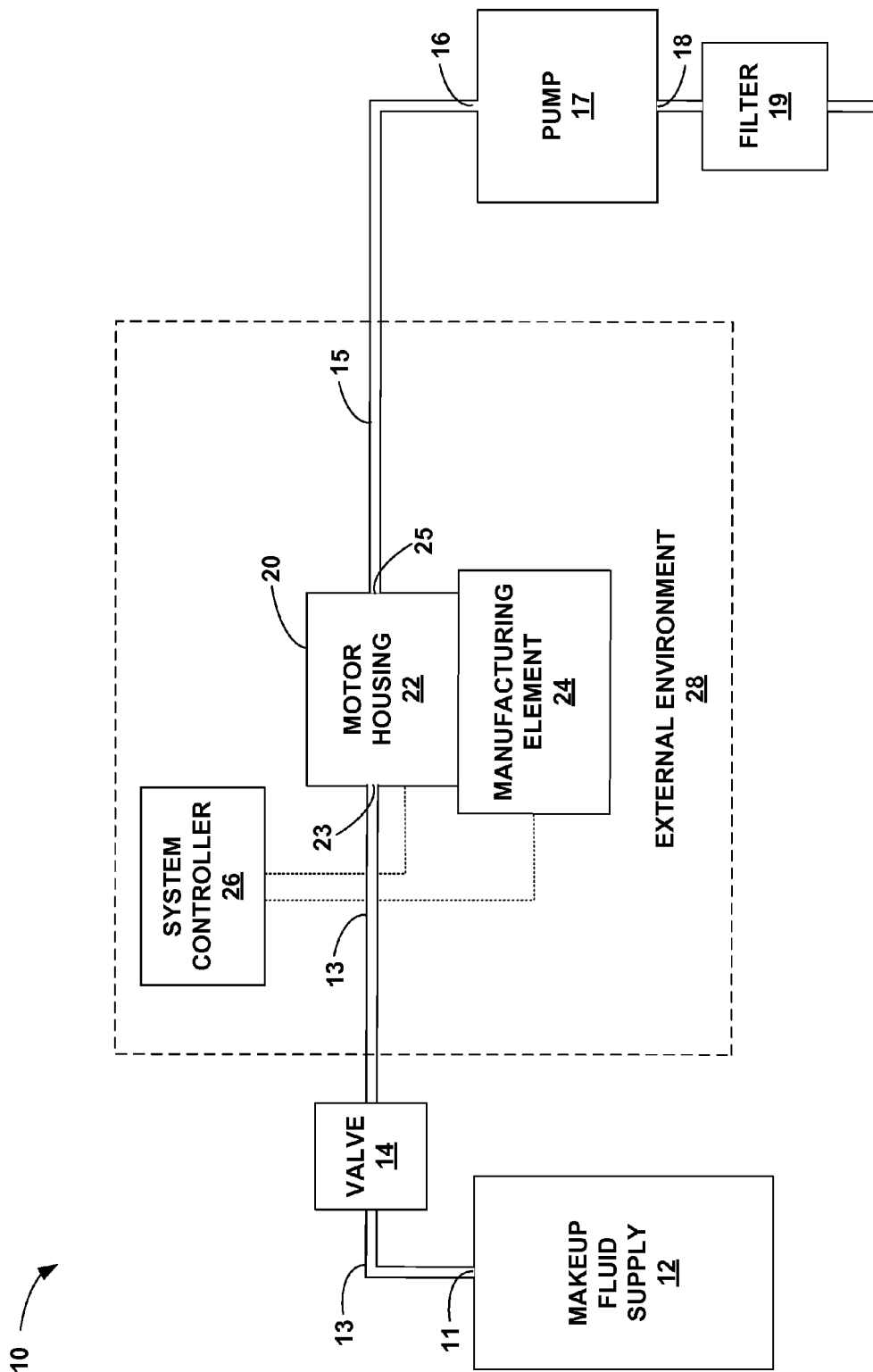
FIG. 1 is a block diagram of a system including an electric motor configured to mitigate potential contamination of an external environment of the electric motor.

FIG. 1 is a block diagram of system 10. System 10 includes electric motor 20, which operates within external environment 28. Electric motor 20 includes motor housing 22, which encloses a substantially-sealed internal environment. System 10 further includes pump 17, which includes pump inlet 16, which is connected to outlet 25 on motor housing 22 via conduit 15.

Pump 17 is configured to create a negative pressure within the substantially-sealed internal environment of motor housing 22 to mitigate potential contamination of external environment 28 with fluid from the internal environment of electric motor 20. For example, external environment 28 may be a high-purity controlled environment within an environmental chamber for a manufacturing process, and contamination of external environment 28 may inhibit the manufacturing process. The negative pressure within motor housing 22 prevents the contents of motor housing 22 from escaping into external environment 28 in the event of small leaks in the sealing of motor housing 22. The negative pressure selected for the substantially-sealed internal environment of motor housing 22 may depend on flow rates and leak sizes system 10 is designed to mitigate. As particular examples, such negative pressure may be selected within the range of about 0.01 millibar to 900 millibar.

System 10 further includes makeup fluid supply 12, which stores a makeup fluid. However, in some examples, makeup fluid supply 12 may simply represent a connection to atmospheric air. Fluid supply 12 includes outlet 11, which is connected to the substantially-sealed internal environment of motor housing 22 via conduit 13. Valve 14 is located within conduit 13 and functions as a regulator. Valve 14 combines with pump 17 to control flow of makeup fluid within the substantially-sealed internal environment of motor housing 22. The flow of makeup fluid through the substantially-sealed internal environment of motor housing 22 limits contamination of substantially-sealed internal environment with contents of the external environment to facilitate safe operation of motor 20. The designed flow rate of makeup fluid through the substantially-sealed internal environment of motor housing 22 may depend on flow rates and leak sizes system 10 is designed to mitigate. As particular examples, such flow rates may be selected from within the range of about 0.01 cubic centimeters per minute up to 10,000 liters per minute depending on the application of system 10.

The designed flow rate of makeup fluid through the substantially-sealed internal environment of motor housing 22 may further be selected to provide cooling for motor 20, which may prolongs life and improves motor efficiency. For example, external environment 28 may comprises gases, such as argon or helium, with relatively low thermal conductivity, such that motor 20 may be subject to overheating or, alternatively, be operated below its rated capacity, without additional cooling, such as the cooling provided by the flow of makeup fluid through the substantially-sealed internal environment of motor housing 22

Filter 19 is optionally connected to outlet 18 of pump 17. Filter 19 is configured to filter fluids exiting outlet 18 of pump 17. Additionally, outlet 18 of pump 17 may be monitored for levels of gas of external environment 28. Relatively higher levels of gas of external environment 28 within outlet 18 of pump 17 indicates less effective sealing within motor 20. In some cases, levels of gas of external environment 28 within outlet 18 of pump 17 may indicate an impending failure of a seal, such as a motor seal. Thus, monitoring for levels of gas of external environment 28 within outlet 18 of pump 17 may facilitate scheduling maintenance to repair or replace degrading seals prior to contamination of external environment 28.

In the example of FIG. 1, motor 10 is included within a manufacturing system as it interacts with manufacturing element 24. In some examples, motor 10 may be a positioning motor for manufacturing element 24; for example, manufacturing element 24 may include a laser, material deposition nozzle, or machining element, such as a cutting, milling or drilling element. In the same or different examples, motor 10 may drive manufacturing element 24; for example, manufacturing element 24 may include a pump or machining element.

In particular examples, the manufacturing element 24 may operate within a controlled environment, which is represented in FIG. 1 as external environment 28. Examples of manufacturing processes that operate within a controlled environment, include, but are not limited to, semiconductor manufacturing, directed energy deposition, chemical vapor deposition, and/or radioactive material handling. Directed energy deposition is generally defined as an additive manufacturing process in which focused thermal energy is used to fuse materials by melting as they are being deposited, as provided by American Society for Testing and Materials (ASTM) designation F2792-12a.

In the example of directed energy deposition, external environment 28 may comprise noble gases, such as argon or helium, such as at least ten percent by weight of argon or helium. In further examples, external environment 28 may consist essentially of noble gases, and may consist essentially of argon to facilitate directed energy deposition. In contrast, the makeup fluid and fluid within housing 22 may consist essentially of oxygen, nitrogen or atmospheric air. This may mitigate risks of electrical shorting of conductors within housing 22 of electric motor 20 due to significant levels of noble gases.

In other examples, external environment 28 may comprise different fluids, including gases, liquids and slurries that may be hazardous to the components of electric motor 20. In any event, by continuously purging the fluid within housing 22, pump 17 limits accumulation of contaminants from external environment 28 within housing 22.

While makeup fluid supply 12, valve 14, pump 17 and filter 19 are illustrated in the example of FIG. 1 as being located outside of external environment 28, in other examples, some or all of these components may be within external environment 28. However, fluids leaving pump 17 should be directed outside of external environment 28 to prevent contamination of external environment 28 with such fluids.

System controller 26 operates to control motor 20 and manufacturing element 24 to implement the manufacturing process of system 10. In some examples, system controller 26 may further control one or both of pump 17 and valve 14 to regulate the fluid flow through housing 22. System controller 26 can include a microprocessor or multiple microprocessors capable of executing and/or outputting command signals in response to received and/or stored data. In some examples, system controller 26 can include computer-readable storage, such as read-only memories (ROM), random-access memories (RAM), and/or flash memories, or any other components for running an application and processing data for controlling operations associated with system 10. Thus, in some examples, system controller 26 can include instructions and/or data stored as hardware, software, and/or firmware within the one or more memories, storage devices, and/or microprocessors. In some examples, controller 26 can include and/or be associated with surface modeling circuitry, regression analysis circuitry, program code modification circuitry, switches, and/or other types of circuitry, as suited for an automated manufacturing process. In the same or different examples, system controller 26 may be directed by a user input to implement one or more manufacturing processes.

Figure 2:
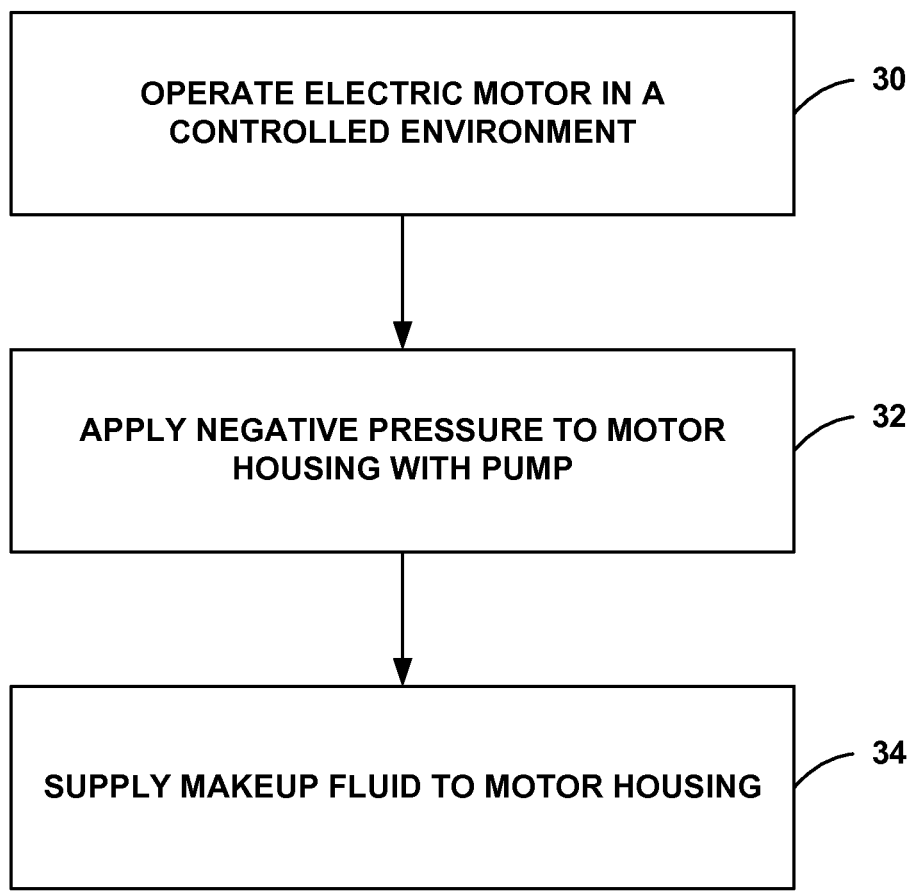
FIG. 2 is a flow diagram illustrating an example technique for operating an electric motor while mitigating potential contamination of an external environment of the electric motor.

FIG. 2 is a flow diagram illustrating an example technique for operating an electric motor while mitigating potential contamination of an external environment of the electric motor. For clarity, the techniques of FIG. 2 are describe with respect to system 10, including motor 20 of FIG. 1.

Electric motor 20 operates within external environment 28 (30). For example, external environment 28 may be a controlled environment for a manufacturing process. Pump 17 applies, during the operation of electric motor 20, a negative pressure to the substantially-sealed internal environment within housing 22 of electric motor 32 via conduit 15 (32). In addition, makeup fluid supply 12 supplies, during the operation of electric motor 20, a makeup fluid via outlet 11 (34). As previously mentioned, makeup fluid supply 12 connected to the substantially-sealed internal environment within housing 22 of electric motor 32 via conduit 13. The negative pressure within the substantially-sealed internal environment of the electric motor mitigates potential contamination of the external environment with the makeup fluid.

Valve 14 is optionally located within conduit 13 and may function as a regulator. The method may further include, during the operation of electric motor 20, operating valve 14 and pump 17 to control flow and/or pressure of the makeup fluid within substantially-sealed internal environment within housing 22 of electric motor 32. The controlled flow and/or pressure may be selected to limit contamination of substantially-sealed internal environment with contents of the external environment.

In addition, the method may further include, filtering, during the operation of electric motor 20, filter fluids exiting pump outlet 18 with filter 19.

In the same or different examples, the method may include using electric motor 20 to position a manufacturing element 24 as part of a manufacturing process. In different examples, such a manufacturing process may include semiconductor manufacturing, directed energy deposition, chemical vapor deposition and/or radioactive material handling.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer system-readable medium, such as a computer system-readable storage medium, containing instructions. Instructions embedded or encoded in a computer system-readable medium, including a computer system-readable storage medium, may cause one or more programmable processors, or other processors, to implement one or more of the techniques described herein, such as when instructions included or encoded in the computer system-readable medium are executed by the one or more processors. Computer system readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer system readable media. In some examples, an article of manufacture may comprise one or more computer system-readable storage media.

Various examples have been described. These and other examples are within the scope of the following claims.

What is claimed is:

1. A system comprising:
    an electric motor including a housing enclosing a substantially-sealed internal environment;
    a pump including an inlet connected to the substantially-sealed internal environment of the electric motor via a first conduit; and
    a fluid supply storing a makeup fluid, the fluid supply including an outlet connected to the substantially-sealed internal environment of the electric motor via a second conduit,
    wherein the pump is configured to create a negative pressure within the substantially-sealed internal environment of the electric motor to mitigate potential contamination of an external environment of the electric motor with the makeup fluid.

2. The system of claim 1, further comprising a regulator within the second conduit between the fluid supply and the substantially-sealed internal environment of the electric motor, wherein the regulator combines with the pump to control flow of the makeup fluid within the substantially-sealed internal environment of the electric motor.

3. The system of claim 2, wherein the flow limits contamination of substantially-sealed internal environment with contents of the external environment.

4. The system of claim 1, wherein the pump includes an outlet, wherein the system further comprises a filter configured to filter fluids exiting the outlet of the pump.

5. The system of claim 1, wherein the makeup fluid consists essentially of oxygen and/or nitrogen.

6. The system of claim 1, wherein the external environment comprises at least ten percent by weight of argon.

7. The system of claim 1, wherein the electric motor is a positioning motor for a manufacturing process, the manufacturing process including at least one of a group consisting of:
    semiconductor manufacturing;
    directed energy deposition;
    chemical vapor deposition; and
    radioactive material handling.

8. An electric motor comprising:
    a housing enclosing a substantially-sealed internal environment;
    an outlet to the housing, the outlet being configured to apply a vacuum to the substantially-sealed internal environment;
    an inlet to the housing, the inlet to the housing being configured to supply a makeup fluid to the substantially-sealed internal environment,
    wherein the inlet and the outlet are configured to create a negative pressure within the substantially-sealed internal environment of the electric motor to mitigate potential contamination of an external environment of the electric motor with the makeup fluid.

9. The electric motor of claim 8, further comprising a regulator connected to the inlet to the housing, wherein the regulator combines with the outlet to the housing to control flow of the makeup fluid within the substantially-sealed internal environment of the electric motor.

10. The electric motor of claim 9, wherein the flow limits contamination of substantially-sealed internal environment with contents of the external environment.

11. The electric motor of claim 8, further comprising a filter configured to filter fluids exiting the outlet.

12. The electric motor of claim 8, wherein the makeup fluid consists essentially of oxygen and/or nitrogen.

13. The electric motor of claim 8, wherein the electric motor is a positioning motor for a manufacturing process, the manufacturing process including at least one of a group consisting of:
   semiconductor manufacturing;
   directed energy deposition;
   chemical vapor deposition; and
   radioactive material handling.

14. A method comprising:
   operating an electric motor within an external environment;
   applying, during the operation of the electric motor, with a pump including an inlet connected to a substantially-sealed internal environment enclosed by a housing of the electric motor via a first conduit, a negative pressure to the substantially-sealed internal environment of the electric motor; and
   supplying, during the operation of the electric motor, a makeup fluid with a fluid supply via an outlet connected to the substantially-sealed internal environment of the electric motor via a second conduit,
   wherein the negative pressure within the substantially-sealed internal environment of the electric motor mitigates potential contamination of the external environment with the makeup fluid.

15. The method of claim 14, further comprising, during the operation of the electric motor, controlling flow of the makeup fluid within the substantially-sealed internal environment of the electric motor with the pump and a regulator within the second conduit between the fluid supply and the substantially-sealed internal environment of the electric motor.

16. The method of claim 15, wherein the flow limits contamination of substantially-sealed internal environment with contents of the external environment.

17. The method of claim 14, further comprising, during the operation of the electric motor, filtering filter fluids exiting the pump outlet with a filter connected to an outlet of the pump.

18. The method of claim 14, wherein the makeup fluid consists essentially of oxygen and/or nitrogen.

19. The method of claim 14, wherein the external environment comprises at least ten percent by weight of helium.

20. The method of claim 14, wherein operating the electric motor includes positioning a manufacturing element as part of a manufacturing process, the manufacturing process including at least one of a group consisting of:
   semiconductor manufacturing;
   directed energy deposition;
   chemical vapor deposition; and
   radioactive material handling.

\* \* \* \* \*